United States Patent
Charles et al.

(10) Patent No.: US 6,592,920 B2
(45) Date of Patent: Jul. 15, 2003

(54) CEREAL INGREDIENT APPLICATION PROCESS

(75) Inventors: Dennis W. Charles, Battle Creek, MI (US); Thomas P. Johnson, Battle Creek, MI (US); Allan R. Olson, Kalamazoo, MI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 153 days.

(21) Appl. No.: 09/886,728

(22) Filed: Jun. 21, 2001

(65) Prior Publication Data

US 2002/0197353 A1 Dec. 26, 2002

(51) Int. Cl.[7] .................................................. A23P 1/08
(52) U.S. Cl. ..................... 426/302; 426/72; 426/455; 426/621; 118/24; 118/300; 118/309
(58) Field of Search ........................... 426/284, 302, 426/443, 455, 309, 285, 618–621; 118/24, 300, 309

(56) References Cited

U.S. PATENT DOCUMENTS

| | | | | |
|---|---|---|---|---|
| 3,840,685 A | | 10/1974 | Lyall et al. | |
| 4,576,108 A | * | 3/1986 | Socola et al. | 118/19 |
| 5,181,954 A | * | 1/1993 | Berrun-Castanon et al. | 75/433 |
| 5,403,395 A | * | 4/1995 | McCullough et al. | 118/19 |
| 5,453,383 A | * | 9/1995 | Roufs et al. | 426/302 |
| 5,645,878 A | * | 7/1997 | Breslin et al. | 426/103 |
| 5,876,775 A | * | 3/1999 | Behnke et al. | 426/302 |
| 5,968,572 A | * | 10/1999 | Behnke et al. | 426/302 |
| 6,209,479 B1 | * | 4/2001 | Walter et al. | 118/20 |
| 6,331,210 B1 | * | 12/2001 | Dodd | 118/303 |

* cited by examiner

*Primary Examiner*—Carolyn Paden
(74) *Attorney, Agent, or Firm*—Thaddius J. Carvis

(57) ABSTRACT

Ready-to-eat cereal is prepared in modified sequence utilizing an apparatus to efficiently apply antioxidant or other useful minor ingredients for ready-to-eat cereal products as they are being conveyed through a conduit, preferably by gravity. The apparatus includes a conduit having an inlet and an outlet, and an external wall defining a passage between the inlet and outlet. The passage has a central zone and a radially displaced application zone adjacent the external wall. A baffle is suspended within the passage to deflect a downward flow of particulate cereal material toward the application zone. A spray applies the minor ingredient onto the particulate cereal in the application zone. Efficiencies in equipment and processing are achieved. Storage life of cereal products awaiting further processing and, thus, final product quality, is enhanced.

3 Claims, 3 Drawing Sheets

CEREAL INGREDIENT APPLICATION PROCESS

BACKGROUND OF THE INVENTION

The invention relates to an improved cereal preparation process and apparatus. In particular, the invention provides an apparatus that can be utilized in a modified cereal process sequence and manipulation to efficiently apply antioxidant and/or other useful minor ingredient(s) for particulate materials, e.g., ready-to-eat cereal products or half products. The invention provides efficiencies in equipment and processing and improves product handling.

Breakfast cereals, as they are sometimes called, have achieved such popularity with consumers that they are no longer served just at breakfast time. Also known as ready-to-eat cereals, they are enjoyed with milk or dry as between meal or evening snacks. They are nutritious, economical and flavorful. However, like most grain-based foods, they do become stale with storage, after a time losing a toasty freshness that is associated with the freshest products. Also, with aging, oils present in the grain or added for flavor or texture are subject to oxidation. This latter effect, lipid oxidation, can affect foods containing fats and oils in a variety of ways. The development of rancid odors and off flavors are the most obvious changes. But, color changes, loss of flavor volatiles, and nutritive changes such as destruction of fat-soluble vitamins and caloric reduction can also occur.

Lipid oxidation occurs when fat molecules, activated by catalyzing agent such as heat, light or other factor, react with oxygen to form peroxides. The peroxides then break down to organic compounds such as aldehydes, ketones, acids, alcohols, etc., resulting in off odors and flavors often associated with rancidity. Once initiated, oxidation proceeds at increasingly greater rates with factors such as heat, ultraviolet light, trace metals, and pigments further catalyzing or promoting oxidation.

This oxidation typically causes the production of undesirable flavors and, in advanced cases, odors which fill the head space gas of the package and are released upon opening. This strongly detracts from the appeal of the cereal. To avoid this, the art has utilized antioxidants, applied at various processing stages.

In the preparation of a typical ready-to-eat breakfast cereal, the starting grain-based formulation is cooked, formed and toasted or otherwise finish cooked to eliminate raw flavor notes and develop fully-cooked grain flavors. Following this processing, it is typical to collect the resulting incomplete cereal, sometimes referred to as a half product or intermediate product, in a surge hopper or wheeled tote to await packaging or further processing. When the product is a simple flake, such as corn flake, no added processing would normally be necessary if antioxidant or vitamins were not to be added. However, where the addition of one of these or other minor additives is desired, there must be another processing step.

Application of various antioxidants to dry cereal products has been accomplished in a number of ways depending on the type of cereal product, production facilities available, and the type of antioxidant. The method of addition must provide complete and uniform application of the antioxidant on the cereal product to provide maximum effectiveness.

Antioxidants have been added in the past by a variety of means. For example, they have been sprayed onto cereals as they are coated with other ingredients. For example, in U.S. Pat. No. 3,840,685, Lyall, et al, applies an antioxidant as part of an emulsion of an oil and sugar solution in a coating reel or drum. In other cases, the antioxidant has been applied as part of an oil coating or separately, in a similar coating device which tends to present a large surface area for coating and provides good mixing. In other prior art arrangements, minor ingredients have been sprayed onto cereal products in auger devices and on belts. However, when done as part of the final stage in cereal preparation, the cereal product can be left exposed to the air, warm and unprotected from oxidation, for periods sufficient for some oxidation of oils present to occur. And, when done as a separate processing step, additional equipment will be required and costs of equipment, maintenance and space can be increased.

In other cases antioxidants have been applied by direct addition by adding the antioxidant at an early processing stage into an ingredient or blending it with the ingredients as they are being mixed. It has also been applied to packaging such as waxed liners for cereal cartons, polyethylene, or paperboard. The antioxidant applied in this latter manner will vaporize from the package and diffuse throughout the cereal product providing protection. Certain packaging materials are also subject to oxidation and may benefit from the presence of antioxidants. While effective for some products, these latter two methods have disadvantages for others.

There remains a need for a simple and efficient manner for applying minor ingredients, like antioxidants and vitamin mixes, to cereal products at an appropriate place in the cereal preparation process. In particular, there remains a need for an improved cereal preparation process and apparatus, which enables application of antioxidants and other minor ingredients to provide efficiencies in equipment and processing and improve intermediate product handling.

BRIEF DESCRIPTION OF THE DRAWING

The invention will be better understood and its advantages will become more apparent from the following description, especially when read in light of the accompanying drawings, wherein.

SUMMARY OF THE INVENTION

Figure 1:
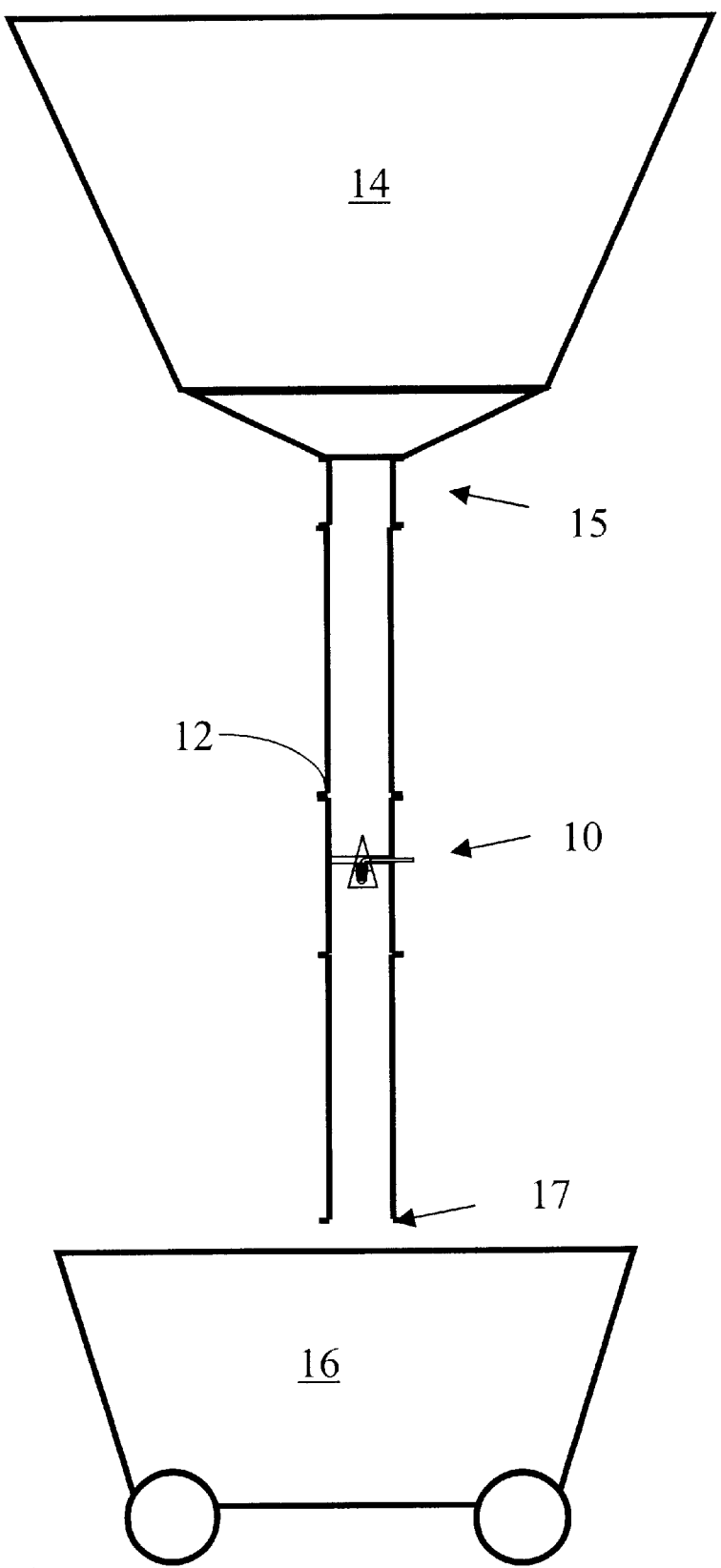
FIG. 1 is an elevational view showing an application device of the invention positioned in a conduit between an elevated source of particulate material and a lower collection vessel, an arrangement which permits the particulate material to flow by gravity.

It is an object of the invention to provide a simple and efficient manner for applying minor ingredients, like antioxidants and vitamin mixes, to cereal products.

It is another object of the invention to provide an improved apparatus for applying minor ingredients, like antioxidants and vitamin mixes, to cereal products to provide efficiencies in equipment and processing and improve intermediate product handling.

It is another object of the invention to provide an improved process for applying minor ingredients, like antioxidants and vitamin mixes, to improve cereal products.

It is yet another object of the invention to provide an improved process for applying minor ingredients, like antioxidants and vitamin mixes, to cereal products to improve intermediate product handling and final product quality.

It is a still further object of the invention to enable the preparation of a ready-to-eat cereal product with antioxidant applied at an early stage in processing to achieve processing efficiencies and improved product quality.

It is yet another object of the invention to provide an improved apparatus for applying minor ingredients, like antioxidants and vitamin mixes, to cereal products, which apparatus is simple in design, operation and maintenance.

It is yet another objective of the invention to provide an improved process and apparatus for applying minor ingredients, like antioxidants and vitamin mixes, to cereal products to provide efficiencies in equipment and processing and improve intermediate product handling and final product quality.

It is a more specific object of the invention to provide an improved process and apparatus for applying antioxidants to cereal products to improve storage life of a cereal product awaiting packaging or further processing.

These and other objects are accomplished by the invention, which provides an improved process and apparatus for applying minor ingredients, like antioxidants and vitamin mixes, to cereal products. In one of its aspects, the apparatus of the invention comprises: a conduit having an inlet and an outlet, and an external wall defining a passage between the inlet and outlet, said passage having a central zone and a radially displaced application zone adjacent said external wall; a baffle suspended within the passage, the baffle being shaped and dimensioned to deflect flow of particulate cereal material from the central zone toward the application zone; and a spray means for spraying the minor ingredient onto the particulate cereal in the application zone.

According to the processing aspect of the invention, a process will comprise: feeding a particulate cereal material through a passage within a conduit having an inlet and an outlet, and an external wall defining the passage, said passage having a central zone and a radially displaced application zone adjacent said external wall; feeding the material past a baffle suspended within the passage, whereby the baffle deflects flow of particulate cereal material from the central zone toward the application zone; and spraying the minor ingredient onto the particulate cereal material in the application zone.

The process and the apparatus have a number of preferred aspects, which are described below and shown in the attached drawing.

DETAILED DESCRIPTION OF THE INVENTION

While the invention has broader utility, the following description will detail one preferred form wherein a ready-to-eat cereal product is treated with antioxidant to achieve processing efficiencies and improved product quality.

As used herein, the term "cereal product" is meant to include completely processed ready-to-eat cereals as well as intermediate products, i.e., half products. Prominent among the cereals that can be treated by the process and apparatus of the invention are the various puffed, flaked, shredded and otherwise shaped and cooked forms of corn, rice, wheat, oats and the like. Other products containing these and other cereals, as that term is known to those skilled in the art, can be treated. The usual cereal ingredients can be supplemented with dried fruits, edible nuts and milk or other proteinaceous ingredients. For example, dried fruit such as coconut, raisins and apricots may be employed. Edible nuts such as almonds, walnuts and others may be used. The cereals can be mixed with these other products before or after treatment according to the invention.

Figure 2:
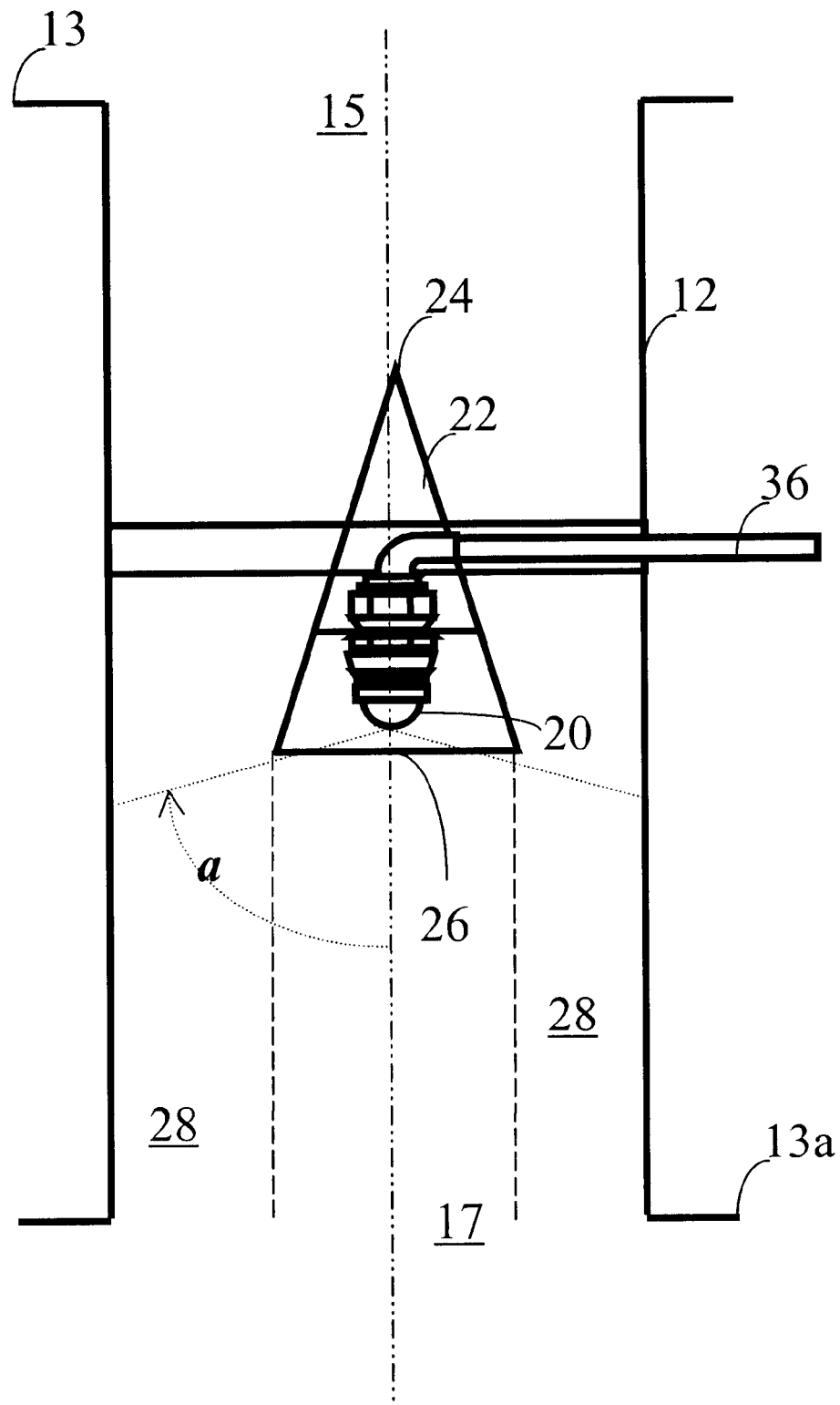
FIG. 2 is a cross sectional view taken along line 2—2 in FIG. 3.
Figure 3:
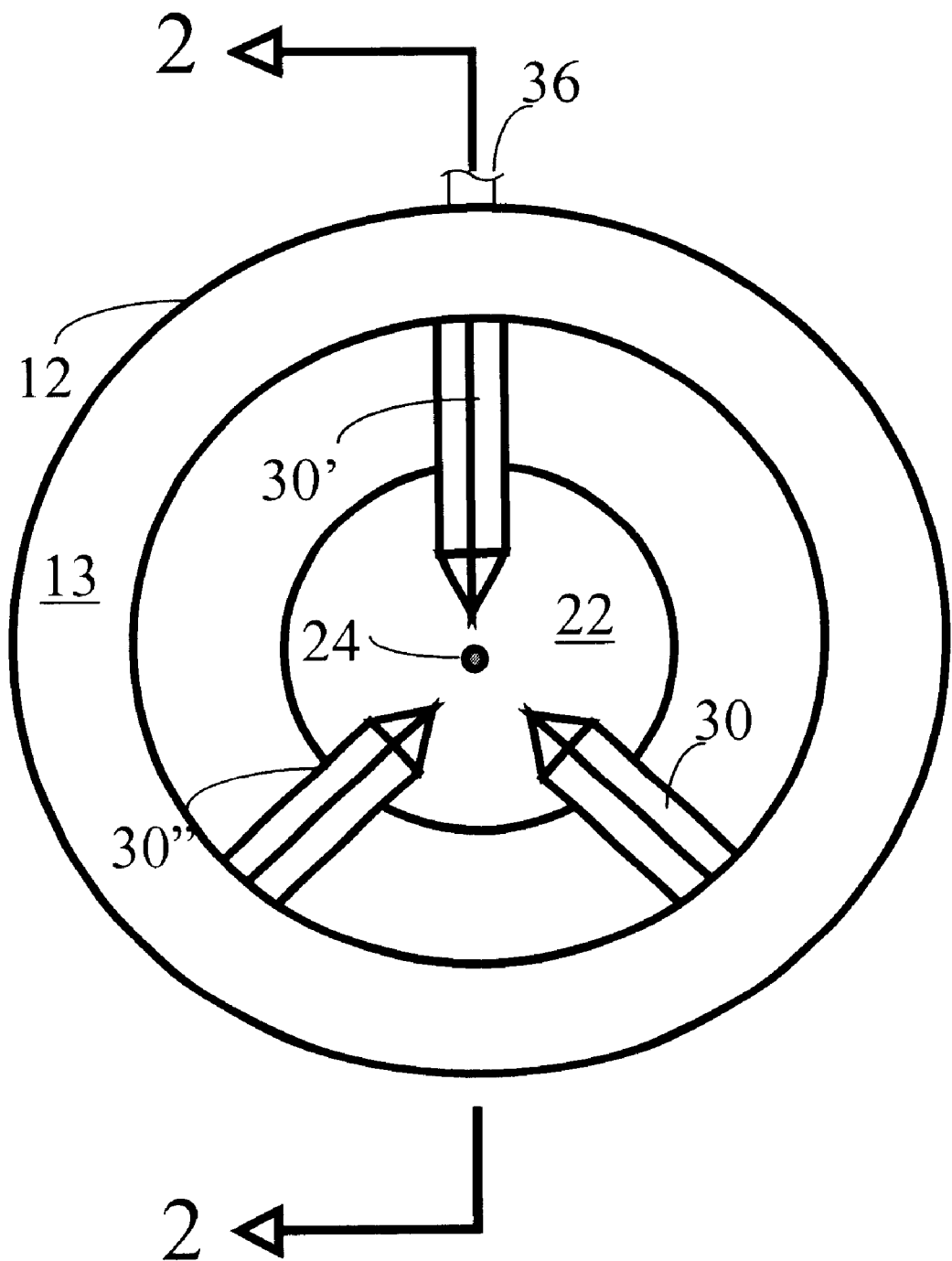
FIG. 3 is a top plan view of the conduit section shown in FIG. 1 containing a novel ingredient application device according to the invention, looking in the direction of flow of a particulate material to which the ingredient will be applied.

Referring now to FIG. 1, there is illustrated, in elevation, a view showing an application device of the invention 10 positioned in a conduit 12 between an elevated source of particulate material (surge vessel 14) and a lower collection vessel (wheeled tote 16). This arrangement permits the particulate material to be treated as it flows by gravity. The application device 10 shown in FIG. 1 is illustrated in greater detail in FIGS. 2 and 3, as having attachment flanges 13 and 13a for incorporation into a larger conduit 12. FIG. 3 is a top plan view of a conduit containing a novel ingredient application device according to the invention, looking in the direction of flow of a particulate material to which the ingredient will be applied. FIG. 2 is a cross sectional view taken along line 2—2 in FIG. 3. The apparatus is preferably constructed in main part of stainless steel, but can include nonstick surfaces where desired and practical.

In operation, a particulate cereal material is fed through the passage in conduit 12 from an inlet 15 at the top to an outlet 17 at the bottom. The material is fed past a baffle 22, which is suspended within the passage, as seen best in FIG. 2. Because of its position and shape, the baffle deflects flow of particulate cereal material from the central zone of the passage toward the conduit wall, the area near the wall defining an application zone. The application zone is generally shown as the area 28 between the dashed lines and the wall of conduit 12, again seen in FIG. 2. While spread out within this application zone, one or more desired minor ingredients are applied to the particulate cereal material in the application zone, The minor ingredients can be antioxidants, colors, vitamin and/or mineral mixes, or the like. Among the suitable antioxidants are BHA (2 and 3-tert-butyl-4-hydroxyanisole), TBHQ (tertiary butyl hydroquinone), BHT (3,5-di-tert-butyl-4-hydroxytoluene), propyl gallate and citric acid, which are typically added in small effective amounts up to a total of about, 0.002%, e.g., about 20 p.p.m. (weight to weight). Because the FDA permits only 0.02% (200 ppm) total antioxidants (based on fat weight), carriers are typically used in solution formulations, including vegetable oil, propylene glycol, and/or mono- and diglycerides. Among the suitable fat or oil carriers are safflower oil, sunflower oil, high oleic sunflower, corn oil, rice bran, soybean oil, sesame, peanut, olive, babassu nut, palm, cottonseed, low erucic rapeseed, and the like oils, with the more highly unsaturated oils being particularly preferred. Typically, a manufacturer can recommend suitable solutions and application rates.

Any of a variety of spray means can be employed, including those designed for low pressure or high pressure, with or without the addition of a carrier fluid in one or more phases. Among the suitable low-pressure devices are those effective to spray liquids under pressure without the use of a carrier fluid. Simple spray nozzles of the hydraulic type are illustrated and preferred. The preferred nozzles of this type will typically emit spray in a conical pattern at a median angle $\alpha$ of about 45° minimum up to 75° maximum, relative to a central axis. Preferred nozzles will produce an average droplet size of from about 350 to about 900$\mu$, mean diameter. The viscosity and/or composition of the solution or dispersion being sprayed, and/or the pressure and nozzle design can be varied to achieve the best spray for the cereal product and applied ingredient concerned.

FIGS. 2 and 3 illustrate a preferred arrangement including an airless spray means 20 positioned downstream of a conical baffle 22 to both distribute the cereal for effective spray application and to protect it from the downwardly moving stream of particulate cereal. The spray means 20 and baffle 22 are shown connected to a section of conduit 12 as will be further explained in connection with FIG. 3.

The baffle 22 has an apex 24 pointed in the direction of the inlet 15 and an open base 26 facing the outlet 17. The spray means 20 is positioned within the open base 26 of the conical baffle 22 (and downstream of the apex 24) and directs a conical flow outward toward the application zone, generally the area 28 defined between the dashed lines and the wall of conduit 12. The spray means 20, in preferred forms will spray radially at an angle effective to direct a spray of ingredient onto the particulate cereal material while substantially all of said cereal material is present in said application zone. It will be noted that in the illustration, the conduit 12 has a central axis that is positioned substantially vertically and passes through the apex 24 and concentrically with a pattern defined by the spray of material from said spray means. The specific conical shape is found effective with puffed cereal products, but can be varied as the shape and density of the cereal product is varied. The descending cereal product is naturally tumbled as it passes beyond the area of spray in application zone 28.

Reference to FIG. 3 shows the interior of the conduit 12 illustrated in FIGS. 1 and 2, looking in the direction of cereal flow. The conical baffle 22 is seen with apex 24 at the center. The conduit 12 can be seen with attachment flange 13 and spokes 30, 30' and 30", e.g., of angled stainless steel, suspend the conical baffle 22 so that it is centered within the conduit. Reference back to FIG. 2 shows one arrangement for suspending the nozzle 20 within the open base of the conical baffle 22, such as by means of support disc 34. Fluid supply conduit 36 supplies minor ingredient and sufficient carrier for the intended purpose.

In addition to the spray nozzles described above, any of the available low-pressure liquid distribution means, such as a mechanical atomizer of the type employed to spray paints, a sonic atomizer, a simple valve extending to a tube with a dispersion device comprising a plurality of orifices to provide a fine spray, a pintle-controlled nozzle capable of adjustable spray patterns, or the like, can be employed. Air-powered nozzles can also be utilized, but it is preferred to operate them with a minimum of air to reduce the cost of the equipment and the effect air may have on the product or spray pattern. In some circumstances air can be employed to advantage, for example maintaining the nozzle and/or baffle clean. Among suitable high-pressure injectors are those similar in type to those employed for fuel injection, which can provide an effective means of easily controlling application rate or even stopping flow as desired.

Following application of the antioxidant or other minor ingredient, the product can be further processed to apply other coatings or to intermix it with other ingredients or it can be directly packaged, such as in sealed plastic bags with outer paperboard boxes.

The following Examples are provided to further illustrate and explain a preferred form of the invention and are not to be taken as limiting in any regard. Unless otherwise indicated, all parts and percentages are by weight.

EXAMPLE 1

This example presents one preferred embodiment of the invention wherein a puffed cereal product is fed from a surge hopper through a transport conduit, similar to that shown in FIG. 1, to be collected within a product tote.

The cereal product is defined generally as puffed oat and corn product having a bulk density of about 145 grams/liter and as passing through a number ¾ inch sieve (19 mm by 19 mm openings).

The cereal is allowed to pass by gravity through a conduit as 12, having a diameter of 12 inches from an inlet, which is 8 feet above the apex 24 of conical baffle 22. The baffle has a height of 8 inches and a diameter at its base of 6 inches. As cereal is fed by gravity down the conduit and past the baffle, it is spread out from the center and substantially against the wall of conduit 12 to form an application zone. A conical hydraulic spray nozzle having a spray tip recessed within the cone and spaced from the cone base by about 2 inches, sprays a solution of BHT in corn oil at a rate of 300 liters per hour onto the descending cereal product, which is then naturally tumbled as it passes beyond the area of spray. The mean spray angle of the nozzle is about 60° and the average droplet size is about 700$\mu$, mean diameter.

EXAMPLE 2

This example presents another preferred embodiment of the invention wherein a puffed corn and wheat cereal product is treated with a vitamin mix. The cereal and apparatus are the same as use in Example 1, but the solution comprises vitamins B1, B2, B6, B12, niacinamide and folic acid in water, and the application rate is 107 liters per hour.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A process for applying a minor ingredient to a particulate cereal material, comprising:

feeding a particulate cereal material through a passage through a conduit having an inlet and an outlet, and an external wall defining the passage, said passage having a central zone and a radially displaced application zone adjacent said external wall;

feeding the material past a baffle suspended within the passage, whereby the baffle deflects flow of particulate cereal material from the central zone toward the application zone; and spraying the minor ingredient onto the particulate cereal material in the application zone.

2. A process according to claim 1 wherein the minor ingredient comprises an antioxidant.

3. A process according to claim 1 wherein the minor ingredient comprises a vitamin mixture.

* * * * *